United States Patent [19]
Napiorkowski et al.

[11] Patent Number: 5,570,422
[45] Date of Patent: Oct. 29, 1996

[54] TELEPHONE NETWORK INTERFACE DEVICE

[75] Inventors: John J. Napiorkowski, Cape Elizabeth; Thomas W. Kroll, South Portland; Boyd G. Brower, Gorham; Robert A. Crane, Windham; Walter K. Butler, III, Standish; Mark P. Cote, Springvale; James G. Beahm, Westbrook; Nils P. Mickelson, Buxton, all of Me.

[73] Assignee: Siecor Puerto Rico, Inc., Hickory, N.C.

[21] Appl. No.: 29,592

[22] Filed: Mar. 11, 1993

Related U.S. Application Data

[63] Continuation-in-part of Ser. No. 956,144, Oct. 5, 1992, Pat. No. 5,333,193, Ser. No. 956,516, Oct. 5, 1992, Pat. No. 5,479,505, Ser. No. 956,531, Oct. 5, 1992, Pat. No. 5,416,837, and Ser. No. 956,746, Oct. 5, 1992, each is a continuation-in-part of Ser. No.523,457, May 15, 1990, Pat. No. 5,153,910.

[51] Int. Cl.$^6$ .................................................... H04M 1/00
[52] U.S. Cl. ............................................ 379/399; 379/327
[58] Field of Search ............................... 361/390, 426, 361/428; 379/329, 399, 329, 412

[56] References Cited

U.S. PATENT DOCUMENTS

| | | | |
|---|---|---|---|
| 4,160,880 | 7/1979 | Brey | 439/571 |
| 4,516,818 | 5/1985 | Johnston et al. | 439/135 |
| 4,675,900 | 6/1987 | Temkin | 379/327 |
| 4,747,020 | 5/1988 | Brickley et al. | 379/327 |
| 4,749,359 | 6/1988 | White | 439/133 |
| 4,789,348 | 12/1988 | Hampton | 439/142 |
| 4,835,659 | 5/1989 | Goodson | 379/327 |
| 4,910,770 | 3/1990 | Collins et al. | 379/399 |
| 4,932,051 | 6/1990 | Karan et al. | 379/327 |
| 5,153,910 | 10/1992 | Mickelson et al. | 379/399 |

OTHER PUBLICATIONS

Siecor brochure, "Siecor Introduces New Multiline NID Solutions", Siecor Corp., Hickory, N.C.
Keptel brochure, "SNI–5000, Tomorrow's Network Interface System Today", Keptel Inc., 1985.

(List continued on next page.)

*Primary Examiner*—Jeffery Hofsass
*Assistant Examiner*—Scott Wolinsky
*Attorney, Agent, or Firm*—Wesley T. Noah

[57] ABSTRACT

A telephone network interface device utilizing network termination modules for interconnecting telephone company wiring to the wiring of respective subscribers incorporates an improved organization of elements to reduce the cost of such elements; to facilitate their use; and to improve the flexibility and compactness of the organization. The device incorporates an improved hinge arrangement for use with the internal security closure that permits ready removal of the closure to facilitate servicing the installed equipment. A novel ground bus organization comprising an assemblage of bus sections of uniform length arranged to accommodate the length of stack of network termination modules housed in the device reduces the variety of ground buses required to accommodate module stacks of various size. Moreover, an improved connection between the respective modules and the ground bus sections insures correct positioning of the modules within the device and reduces the danger of inadvertent disconnection of the modules from ground. A particular form of network termination module is utilized which permits ready transfer of subscriber wiring between available network interface jacks in the device. The subscriber wiring is connected via a detachable terminal strip secured by a releasable latch which is concealed beneath a dedicated closure cover that is mounted for movement with the terminal strip. Transfer of terminal strips between interface jacks is enhanced by a wire routing arrangement including wire guides of particular design that enable access of all terminal strips with every interface jack without need for wiring disassembly.

25 Claims, 8 Drawing Sheets

OTHER PUBLICATIONS

GTE brochure, "Weatherproof, Corrosion Proof . . . and We Guarantee It", Sylvania GTE Control Devices, Dec. 1984.

Lipincott brochure, "GL–700 Multi–Unit Network Interface Device", Lippincott Industries, Spokane, Washington, May 1988.

Lippincott advertisement, vol. 211, Telehony, Sep. 9, 1986.

GTE brochure, Protected Terminating Device NI–2006, GTE Control Devices, Standish, ME, May 1992.

GTE brochure, Protected Terminating Device PTD, GTE Control Devices, Standish, ME, May 1992.

GTE brochure, Protected Terminating Devices NI–2025, NI–2050, NI–2100, NI–2200, GTE Control Devices, Standish, ME, May 1992.

GTE brochure, Introducing the Next Step In the Evolution of Network Interface Technology, GTE Control Devices, Standish, ME, May 1992.

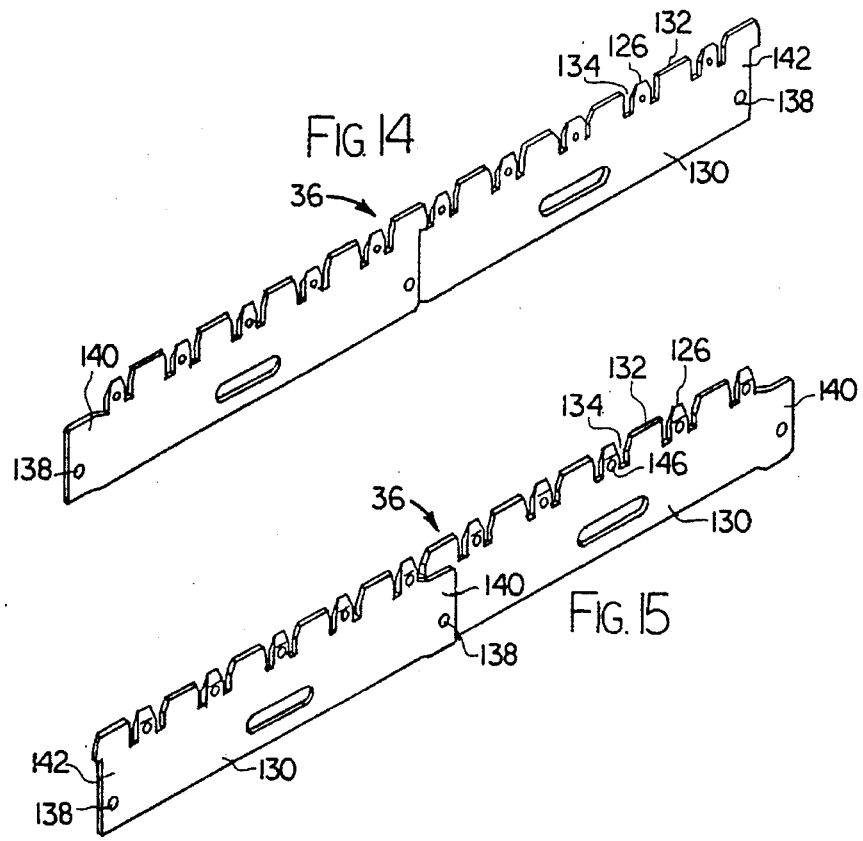
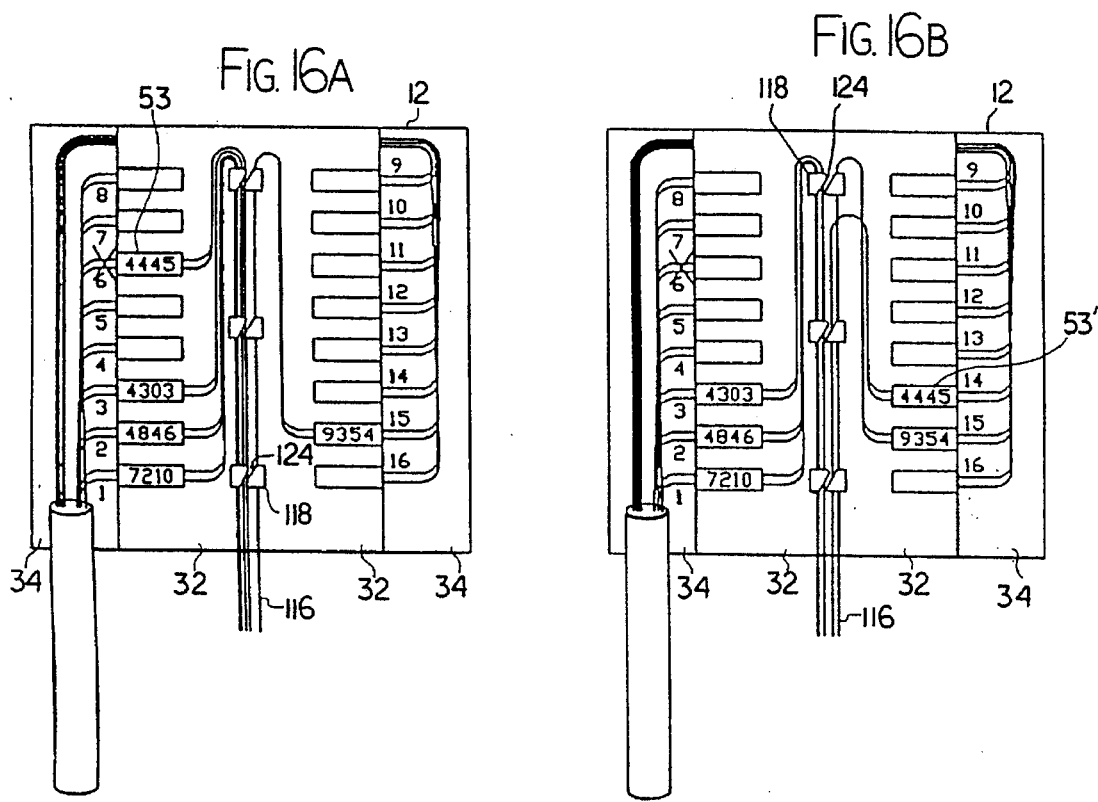

TELEPHONE NETWORK INTERFACE DEVICE

This application is a continuation-in-part of U.S. patent application Ser. Nos. 07/956,144 (now U.S. Pat. No. 5,333, 193), 07/956,516 (now U.S. Pat. No. 5,479,505), 07/956,531 (now U.S. Pat. No. 5,416,837) and 07/956,746, all filed on Oct. 5, 1992, which are all continuations-in-part of U.S. patent application Ser. No. 07/523,457, filed May 15, 1990 (now U.S. Pat. No. 5,153,910). The disclosures of each of these patent applications are incorporated herein by reference.

BACKGROUND OF THE INVENTION

The present invention relates to telephone network interface devices. More particularly, the invention relates to a telephone network interface organization containing comprehensive modifications directed to improvements in the design, fabrication and utilization of such equipment.

Telephone network interface equipment has utility in an environment in which telephone service is delivered to a plurality of subscribers and has as its purpose to isolate the telephone company ("telco" herein) portion of the system or wiring from that serving the respective subscribers. Such isolation is desirable in order to segregate the responsibility for faults or malfunctions that may occur in the respective parts of the system.

In practice such equipment normally comprises a container or housing, the interior of which is divided into a "telco" portion and a subscriber portion. Covers are provided for the respective housing portions that permit only telco access to the telco portion of the housing and both telco and subscriber access to the subscriber portion thereof. In such housings of the prior art the covers are pivotally mounted to the housing by means of pin-type hinges which suffer the disadvantage that separate hinge assemblies are required for mounting to both the housing and the cover or panels therein; the requirement for a pin introduces an extraneous part to the connection; and the need to carefully align the hinge elements in order to install the pin renders removal and replacement of the covers both laborious and time consuming. It is the amelioration of these problems, therefore, that is addressed by one aspect of the invention.

Moreover, the subscriber portion of the housing normally contains a plurality of individual subscriber terminal units (commonly referred to as "terminal strips") which support the terminals for subscriber wiring and are disposed in adjacently stacked array along the base of the housing. Such devices are separate units that are removably and interchangeably installed in the housing typically on an individual module containing a network interface jack. Separable terminal strips employed in prior art network interface devices are of two principal types. The first, of which the device disclosed in U.S. Pat. No. 4,741,032, issued Apr. 26, 1988 to Hampton is representative, requires use of a tool such as a screw-driver for its removal. This form of terminal strip is undesirable in that the need for a tool for its attachment and removal is an inconvenience. More importantly, however, is the fact that, since the attachment screw for the device is clearly visible and accessible, unauthorized use of telephone service can occur by a subscriber's removal of the terminal strip from its assigned position and placement at an adjacent interface jack whereupon service can be misappropriated through the line of another subscriber. The second form of terminal strip is one such as that described in U.S. Pat. No. 4,979,209, issued Dec. 18, 1990 to Collins et al., in which no positive fastening means is employed to secure the terminal strip to the housing whereby removal from the assigned service line may occur not only intentionally but accidentally, as well. Consequently, according to another aspect of the disclosed invention there is provided for use with the terminal strip, a latching mechanism that is not apparent to one untrained with the equipment, yet effective to positively secure the strip against removal.

Terminal strips contemplated for use in the disclosed network interface arrangement are, furthermore, provided with an improved security cover arrangement. Multi-line network interface devices, as typified in U.S. Pat. Nos. 4,749,359, 4,825,466, 4,979,209 and 5,153,910, are normally provided with individually lockable security covers over each termination in order to prevent unauthorized access thereto. Such covers also serve to protect against inadvertent electrical shock; to provide a place for identifying markings; and to align and secure the interface plug and associated sealing members. The covers, as shown in these prior patents, may be pivotally hinged either to the body of the interface jack or to the housing which mounts the jack. A major disadvantage with such arrangements is that, since responsibility for the cover, plug and terminal strip rests with the subscriber, if for any reason the telephone company must replace the jack or housing, it must of necessity replace the cover thereby destroying or eliminating any identifying markings carried thereby. This problem is avoided by practice of the present invention wherein the security cover is hingedly attached, instead, to the terminal strip body which is, itself, removable from the jack thereby facilitating movement of subscriber terminal strips with wiring and cover intact for line reassignment from one network interface jack to another. Thus, not only is it unnecessary to unwire and delicately remove the terminal strip from the housing, but also any markings present on the cover are preserved.

According to another aspect of the invention improvements are made in the means for grounding the separate interface modules in the network interface system wherein it is known to ground each terminating device. U.S. Pat. Nos. 4,882,647 and 4,979,209, both to Collins et al., describe means for grounding in the form of a ground bus specially adapted to mount and connect a plurality of protecting elements. While the grounding means described in these patents constitute improvements over a grounding system in which separate wires extend from one protecting element to the other, they are not totally dispositive of all problems that are manifest in the concerned systems. For example, the ground bus device embodied in the disclosed apparatus comprises a plurality of individual ground bar sections or modules that can be fabricated as uniform members and a prescribed number of which can be installed in a container or housing dependent upon the number of protecting elements to be accommodated therein.

The ground bus devices may also be advantageously provided with tangs on which the protected terminating devices are mounted, each such tang bearing a detent in the form of a depression or hole for reception of a specially configured spring-biased projection on the electrical contact or "ground clip" that seats in the detent. Such detents provide a positive indication that the devices are properly seated, as well as a supplemental retention force against removal of the device.

Further according to the disclosed invention, the housing which defines the containment for the network interface system possesses a physical layout that is especially designed to facilitate movement of the respective subscriber terminal strips for line reassignment from one interface jack to another without need for unwiring and rewiring the unaffected members of the system.

SUMMARY OF THE INVENTION

Accordingly, there is provided an improved telephone network interface device comprising a housing having an opening to the interior thereof; said housing interior containing a telco wiring portion and a subscriber portion; a plurality of network termination modules removably secured to said housing in stacked, side-by-side relation within the subscriber portion thereof; means in said housing for accessing the telco wiring portion thereof with telephone company wiring; means in said housing for accessing the subscriber portion thereof with subscriber wiring connecting with said termination modules; means forming a ground bus electrically connecting all of said interface modules; and cover means effective to restrict access to said telco wiring portion of said housing including a pair of covers and means for mounting said covers for independent pivotal movement with respect to said housing, one of said covers being sized to operably close said housing opening, and the other of said covers being sized to operably close only said telco wiring portion of said housing interior.

According to one aspect of the invention, the telephone network interface device of the invention advantageously includes a novel hinge organization for mounting that cover which restricts access to the telco wiring portion of the housing comprising a hinge member formed as a loop-shaped end configured to receive a cooperating notch in the cover to accommodate both pivotal movement of the cover between open and closed positions and ready removal of the cover as, for example, to facilitate servicing of the equipment.

According to another aspect of the invention the ground bus employed with the device has a sectional configuration in which a selected number of ground bus sections, that are formed of uniform length, are joined in contiguous, end-to-end relation to accommodate all of the network termination modules mounted in the housing. Sectioning the ground bus in this way reduces the variety of parts that must be maintained for accommodating devices of varying capacity as well as the number of manufacturing tools required for fabricating the parts.

Also, the described ground bus sections are formed with grounding tangs to connect with each terminating module. The disclosed grounding tangs are formed with a detent receptor in the form of a recess or of an opening to receive a cooperatively formed projection on the module contact to inhibit release of the contact between the module and the bus once it has been made.

The network termination modules employed in the described network interface device utilize a subscriber terminal strip that is detachably coupled to the module base structure. The coupling is effected by a latch arrangement employing a flexible shouldered arm on the terminal strip that positively, yet releasably, interconnects the members by cooperative engagement with a shoulder-forming lip on the base member. Terminals in the terminal strip are protected by a pivotally mounted cover that overlies both the terminals and the latch arrangement to thereby remove the latch from view and reduce the chance of unauthorized disassembly of the modules. Unlike security covers employed in similar devices of the prior art, the instant cover is advantageously arranged for hinged connection to the associated terminal strip whereby, in addition to restricting access to the terminals; protecting against electrical shock; and carrying subscriber identification markings, the terminal strip can have its connection to a base structure changed to another base structure in the housing without need to disassemble the subscriber wiring and without loss of the subscriber identification markings.

In order to facilitate selective relocation of the terminal strips they are advantageously formed at the end opposite that containing the latch arrangement with a projecting finger adapted for reception in an arched retainer formed on the base structure. The relationship between the hinge/retainer assembly and the latch arrangement is such that the terminal strip can be easily installed on, or released from, the base structure when desired.

Furthermore, the organization of the described network termination module is such that a latch employed to secure the cover to the base structure can be conveniently located closely adjacent that securing the terminal strip to the base structure. In this way, not only is the amount of space required to house the assemblage reduced, but the same latch-engaging lip on the base structure can be utilized for securing both latches thereby further reducing space requirements for the module.

Importantly, a wiring organization is utilized in the described network interface device that lends flexibility to the installation and relocation of subscriber terminals in the device. Subscriber wiring within the housing extends along a wiring path defined by wire guides. The wires connecting the terminal strips are made longer, as compared with comparable wires of the prior art, in order to be provided with a length adequate to permit access of the connected terminal strip to any base structure location in the housing after wiring is completed. Also, the wire guides are slotted to permit release and/or redirection of the wires when desired. Thus, a particular routing of subscriber wires can be required, to permit relocation of a terminal strip from its initial base structure jack to one in another base structure as may be required when a particular pair of telco wires may become damaged or used for other service.

For a better understanding of the disclosed invention, its operating advantages and the specific objectives obtained by its use, reference should be made to the accompanying drawings and description which relate to a preferred embodiment thereof.

BRIEF DESCRIPTION OF THE DRAWINGS

FIG. 14 is a perspective view illustrating coupled sections of the ground bus organization according to the invention;

FIG. 15 is a perspective illustrating the other side of the coupled sections of the ground bus organization of FIG. 14; and FIG. 16a and 16b are diagrammatic illustrations showing the preferred wiring organization for a network interface device according to the invention.

DETAILED DESCRIPTION OF THE PREFERRED EMBODIMENTS

Figure 1:
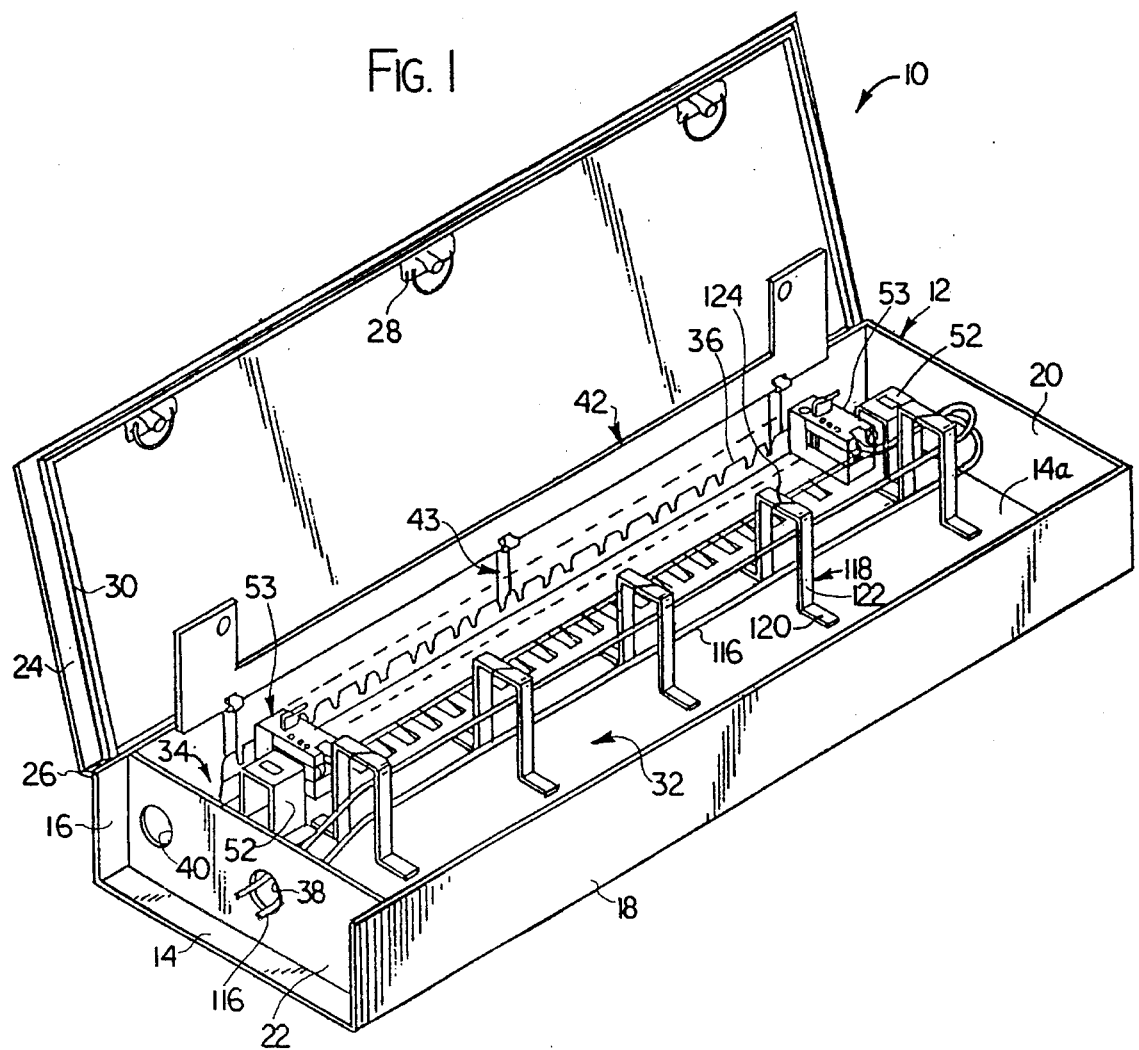
FIG. 1 is a perspective view of a telephone network interface device according to the present invention illustrating the covers in an open condition.

Referring now to the drawings there is shown a telephone network interface device 10 according to the present invention. Device 10 comprises an enclosure housing 12 which includes a back wall 14 from which a pair of opposed side walls 16 and 18 and top and bottom walls 20 and 22, respectively, extend to form a frontal opening. The frontal opening is closed by a closure cover 24 which is mounted to side wall 16 by means of hinge 26. Rotatably secured to the cover are a plurality of helical latches 28 and rectangularly disposed flexible seal pads 30.

The interior of the enclosure housing 12 contains a raised panel 14a spaced from the back wall 14 and is divided generally into a subscriber portion 32 and a telephone company wiring portion 34. Positioned generally between subscriber portion 32 and telco portion 34 is ground bus 36 that extends in spaced, parallel relation to the side wall 16. A pair of through-openings 38 and 40 formed in the bottom wall 22 permit access to subscriber portion 32 and telco portion 34 respectively for wiring which is described in more detail hereinafter.

Security for the telco wiring portion 34 of the housing 12 is provided by a plate-like cover 42 that is mounted for pivotal movement on a plurality of longitudinally spaced, aligned hinges 43. The hinges 43 each comprise a columnar member 44 formed of essentially folded metal strap material which includes offset feet 45 at the bottom end for attachment, as by means of welding, riveting, or the like to the back wall 14 of housing 12. At the opposite end the member is formed as a loop 46 whose sectional shape, as shown, is essentially elliptical or flattened. The opposed edges of the upwardly or outwardly facing surface of the loop 46 contain inwardly-directed recesses 47 to define a portion of reduced width.

Figure 8:
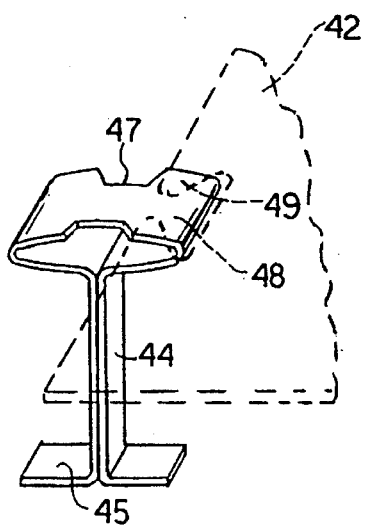
FIG. 8 is a partial perspective view of a hinge body according to the invention.
Figure 9:
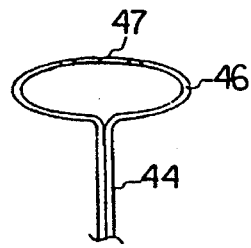
FIG. 9 is a partial side view of the hinge body of FIG. 8.
Figure 10:
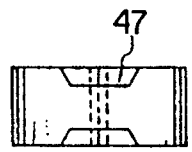
FIG. 10 is a top view of the hinge body of FIG. 8.

The hinge connection is implemented by the provision along the edge of the cover 42 of a notch opening 48 enabling reception of the cover on the respective hinge bodies. As shown best in FIGS. 1, 2 and 8, the notch opening 48 is formed, in part, by a pair of opposed projections 49 on a spacing which corresponds essentially to the transverse width of the portion of the loop 46 formed by recesses 47.

Thus, the cover 42, due to the cooperation between the hinge loop 46 and the notches 48, is permitted to readily pivot between a fully open position (FIG. 1) and a fully closed position (FIG. 2), The cover 42 in its closed position overlies and encloses the telco wiring portion 34 of the housing 12. Offset portions 50 provided at opposite ends of the cover each contain an opening 51 for reception of a connector (not shown), preferably a fastener of the quick-release type, to cooperate with openings in standards 52 for securing the cover in its closed condition.

The cooperative relationship between the spacing between the projections 49 on the cover and the reduced width portion of the loop surface between the recesses 47 thereon additionally serves two important functions, First, the relationship is such that angular disposition of the cover over the length of the recessed surface portion permits the cover to be readily removed from the housing, as for example, when there may be a need to replace it due to damage, or the like, or, alternatively, when servicing of the telco wiring may require such removal.

Secondly, due to the vertical disposition of the housing and cover, the recesses 47 provided on the upper edges of the respective hinge loops 46 define receptacles into which the cover 42 will lodge when opened and thereby serve to maintain the cover in an opened condition as is desirable when servicing the telco wiring.

The extended U- or C-shape of the cover 42, it will be noted, provides an effective closure over the telco wiring portion 34 of the housing 12 while exposing for subscriber access those elements of equipment within the network interface device 10 which carry subscriber elements of the respective circuits, as explained hereinafter in connection with the network termination modules 53.

Stacked in side-by-side relation within the housing interior are a plurality of network termination modules 53, only two of which are illustrated in FIG. 1. The modules 53 are fixedly secured to the housing by means hereinafter more fully described. It should be understood, that the module stack may contain any number of modules 53 dependent upon the number of telephone services to be handled by the device 10.

Figure 13:
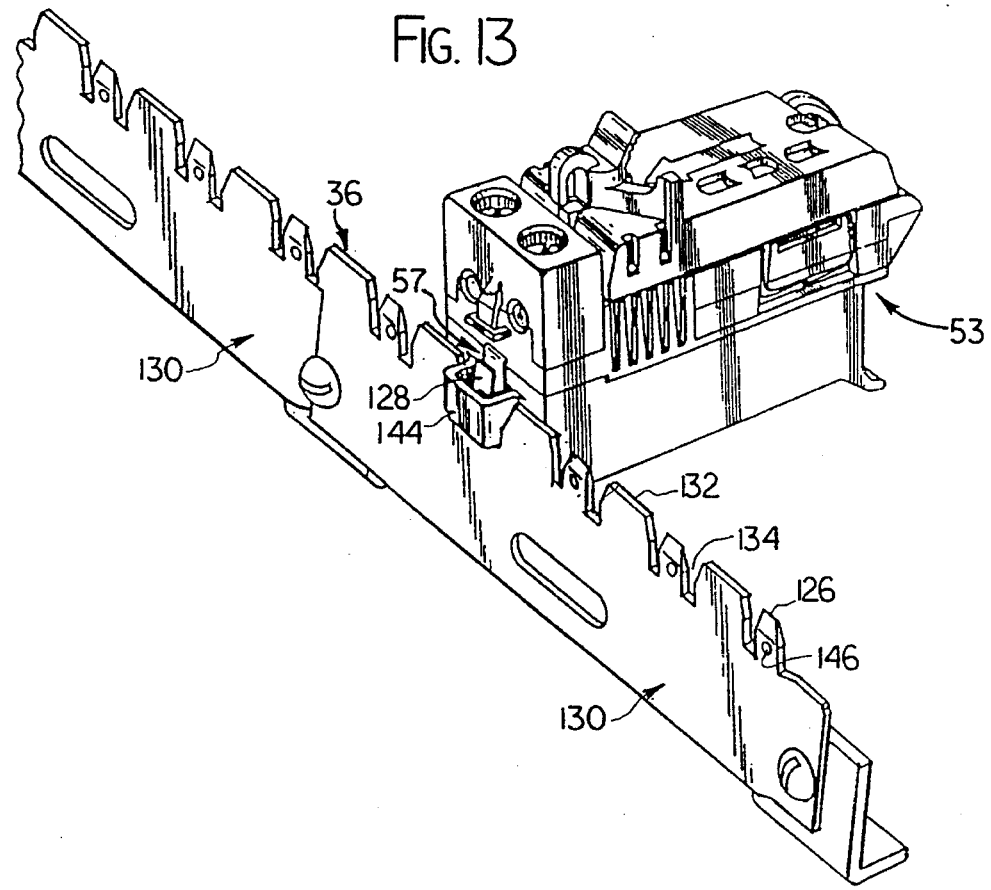
FIG. 13 is a perspective view illustrating the interconnection of a network termination module and a ground bus according to the invention.

Each of the disclosed network termination modules 53 comprises a base structure 54 defined by rectangularly disposed sides forming a closed container 55 within which is a telephone electronic circuit 56. At one end, the base structure 54 is provided with a grounding device, indicated generally as 57, and at the other end with a pair of depending locking feet 58 that engage undercut grooves 59 in the housing panel 14a for fixedly securing in cooperation with the grounding connection, as described with regard to FIG. 13, the module 53 to the housing 12. The upper side of the base structure 54 is formed by intermediate support 60 having body portions 61 and 62 that house a telephone jack 63 and a pair of line terminals 64, respectively. The remainder of the structure is defined by a platform 65 having a receptor arch 88 at one end for reasons made apparent hereinafter. Intermediate support 60 is desirably fixed to the base structure 54 by means of pressure welding, or the like. Telco wiring can be connected to line terminals 64 through wire entry ports 64a. Wires 66 and 67 serve to connect the electronic circuit 56 to the line terminals 64 and to jack 63, respectively. Depending contact pins 68 extend from the line terminals 64 to electrically connect them to the terminals 70 of a protective element 72 which is housed within a forward compartment 73 of the base structure 54.

Figure 6:
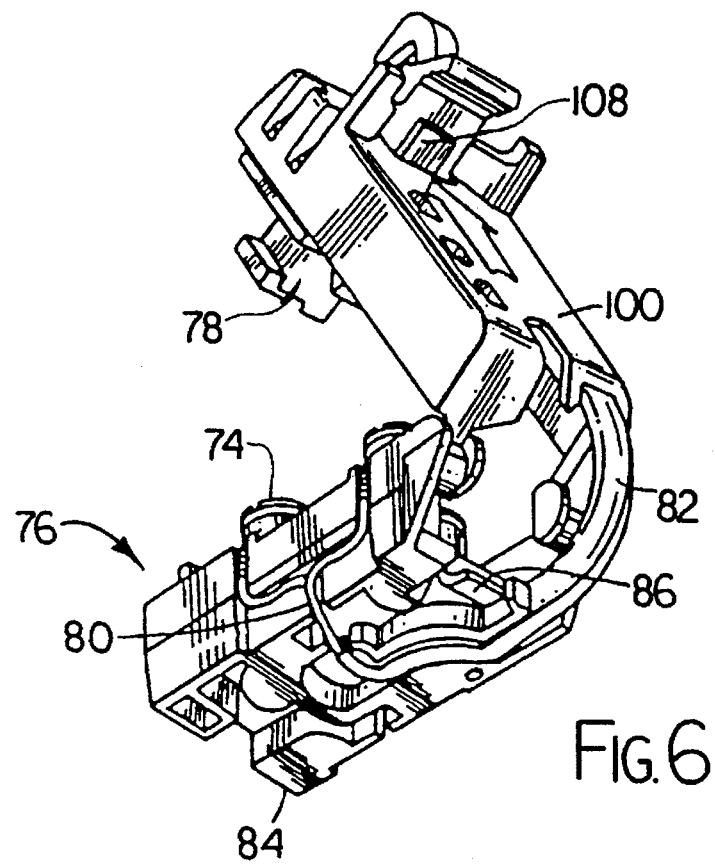
FIG. 6 is a perspective view of the terminal strip portion of the network termination module of FIG. 4 shown detached from the module base structure.
Figure 7:
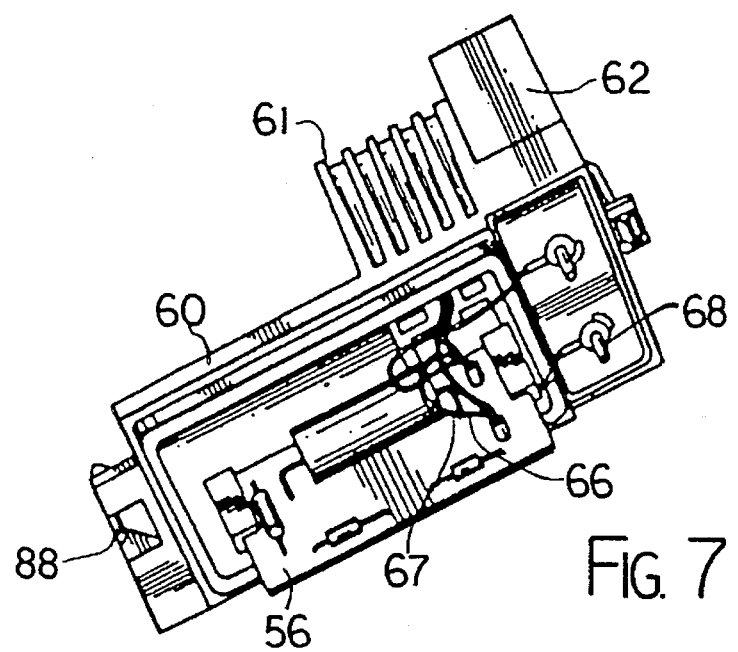
FIG. 7 is a bottom perspective view of an intermediate portion of the base structure of the network termination module of FIG. 4.
Figure 11:
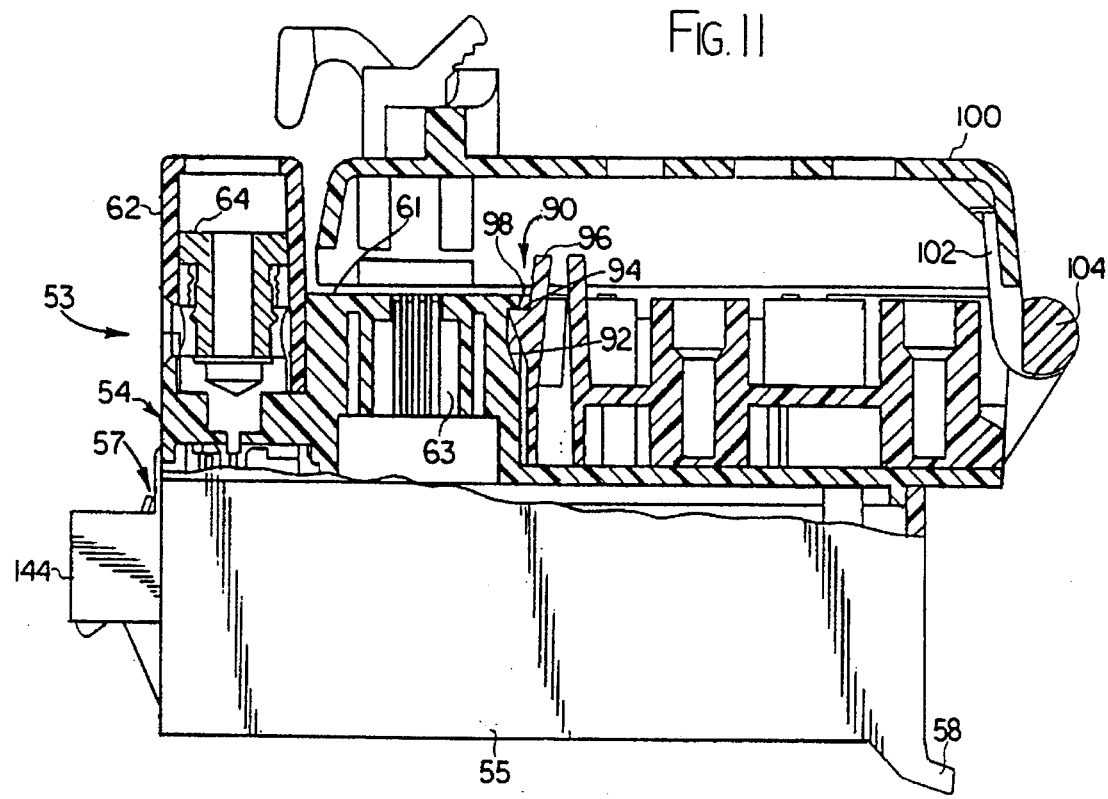
FIG. 11 is a sectional elevational view taken along line 11—11 of FIG. 4.

The subscriber terminals are indicated by reference number 74. These terminals 74 form part of a terminal strip 76 and are electrically connected to a telephone plug 78 by means of wires 80 and cable 82 (FIG. 6). The terminal strip 76 is adapted to be removably connected to the platform 65 of the intermediate support 60, as follows. The terminal strip 76 comprises a body 84 that, on its upper surface, mounts the terminals 74 and has its bottom surface formed with recesses for conducting the wires 80 and cable 82. Extending from the bottom surface at the rear end of the body 84 is a generally hook-shaped projecting finger 86. The finger 86 is adapted for reception in a receptor 88 formed as an arch on the rear end of the platform 65. At its forward end the terminal strip body 84 is provided with a releasable snap latch 90 comprising an upstanding flexible arm formed integrally with, and disposed adjacent to one side of the body. Intermediate its length the latch arm is provided with an upwardly and outwardly tapered surface 92 terminating in an upwardly facing shoulder 94. Shoulder 94 is adapted to normally engage the underside of an overhanging lip 98 formed on the facing surface of the body portion 54 of the intermediate support (FIG. 11). That portion 96 of the arm extending beyond the shoulder 94 forms an actuator by means of which the arm can be manually flexed to disengage shoulder 94 from the lip 98 for releasing the latch 90 and thereby enable disengagement of finger 86 from receptor 88 for detachment of the terminal strip.

Figure 12:
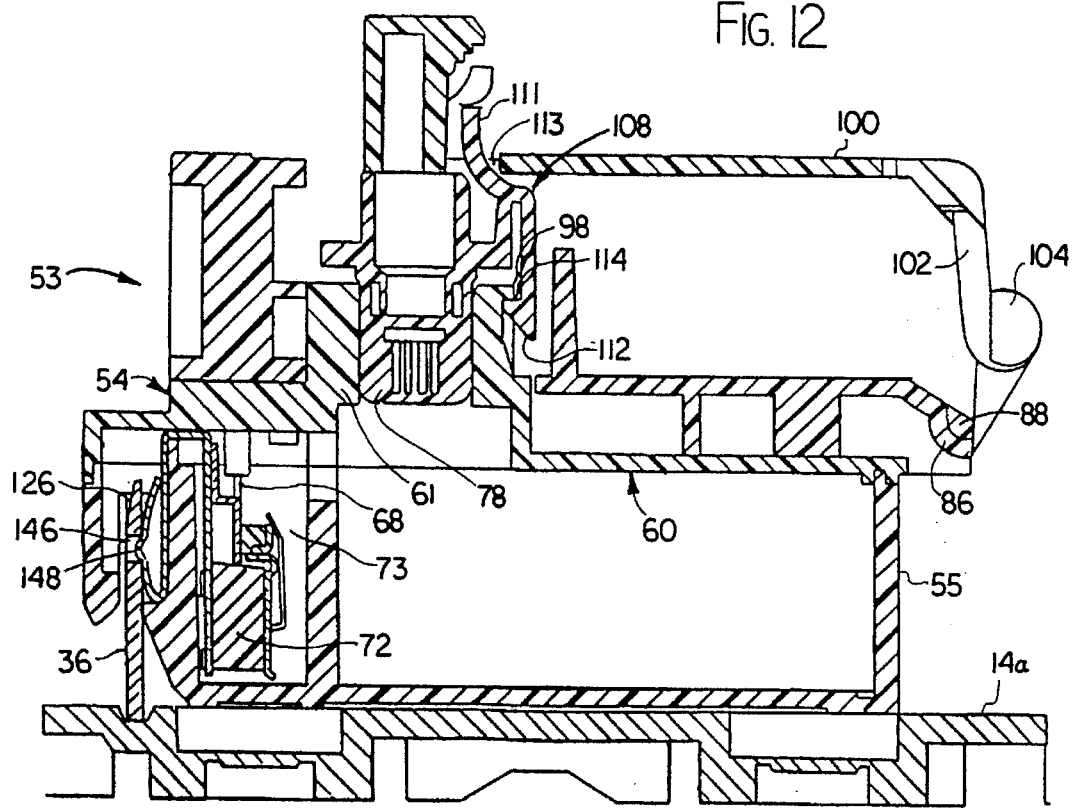
FIG. 12 is a sectional elevational view taken along line 12—12 of FIG. 4.

As shown in the drawing figures, according to the present invention the security cover 100 of the terminal strip 76, rather than being hinged for pivotal movement to the base structure 54 or to the housing 12 which houses the modules as in prior art devices (see U.S. Pat. Nos. 4,749,359, 4,825,466, 4,979,209 and 5,153,910), the cover at opposite sides of its rear end is provided with hinge elements 102 that engage cooperating stationary hinge pins 104 formed on the terminal strip body 84. The disclosed cover 100 is of a size to overlie the upper surface of the terminal strip body 84 to cover, when closed, the subscriber terminals 74 and the snap latch 90. As shown, the free end of the cover 100 extends beyond the end of the body 84 and mounts a telephone plug 78 which is received in the telephone jack 63 when the cover is pivoted to its closed condition, The cover 100 contains a snap latch mechanism 108 which, when in its operative position, is disposed laterally adjacent the latch 90 so as to utilize the same lip 98 on the body portion 61 of the intermediate support 60 for effecting the locking function. The latch mechanism 108, as best shown in FIG. 12, comprises a depending arm 110, here shown as being formed as an integral part of the plug 78, and having a wedge-shaped element 112 defining an upwardly facing shoulder 114 for cooperative engagement with the lip 98. An extension of the arm 110, indicated as 111, extends through an opening 113 in the cover to permit release of the cover.

As a result of this organization, the cover 100 and plug 78 are made an integral part of the terminal strip element 76. Hence, if the telephone company has need to replace the base structure 54, there is no longer a need to remove and replace the cover with the replacement of these members. Thus, the destruction of any identifying markings of the subscriber that are carried by the cover is prevented. Furthermore, the described organization of network terminating modules 53 facilitates line reassignment within the network interface device housing 12 since the terminal strip 76, being detachable from the base structure 54 together with its cover 100, can be simply removed from its initially-assigned base structure and relocated for installation in an alternate, vacant base structure, as may be desirable where a particular set of telco wires may no longer be available, due either to damage to the circuit or to a need to use the circuit for other service or, alternatively, where a tenant subscriber, due to a relocation within the building, may require transposition of its telephone jack.

Figure 2:
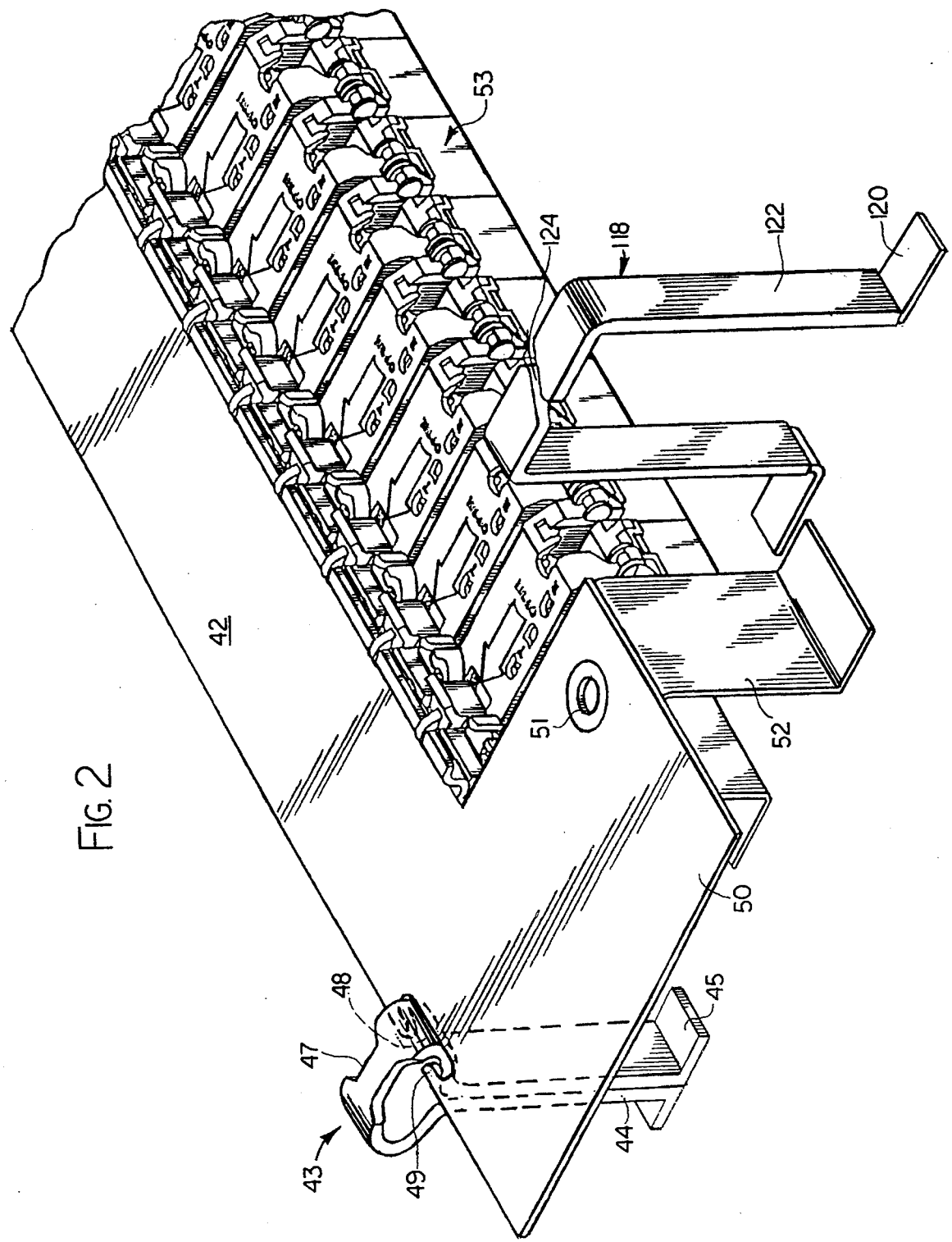
FIG. 2 is a perspective view similar to FIG. 1 illustrating the telco security cover in its closed condition.
Figure 3:
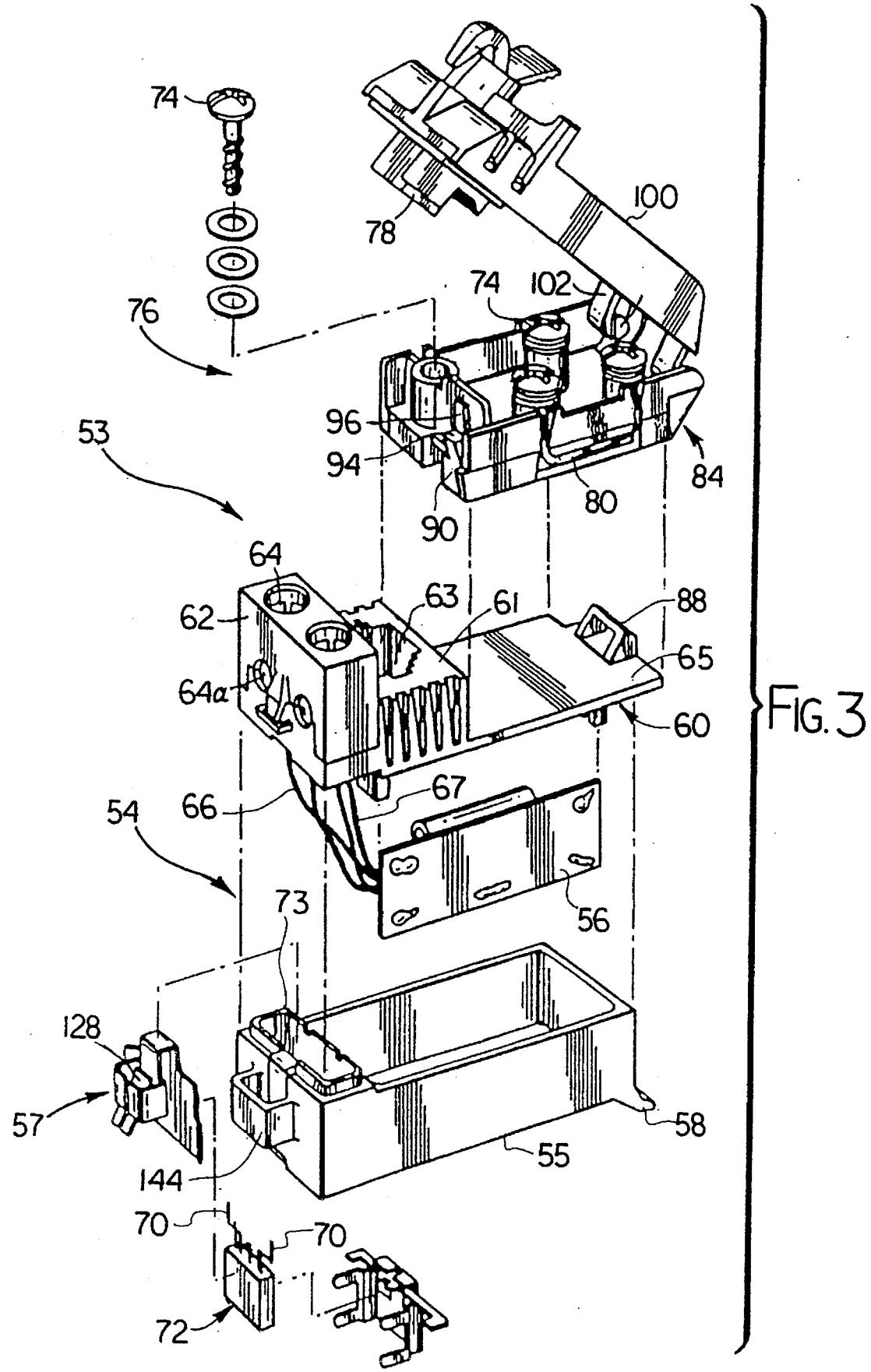
FIG. 3 is an exploded perspective view of a network termination module adapted for use in the network interface device according to the invention.
Figure 4:
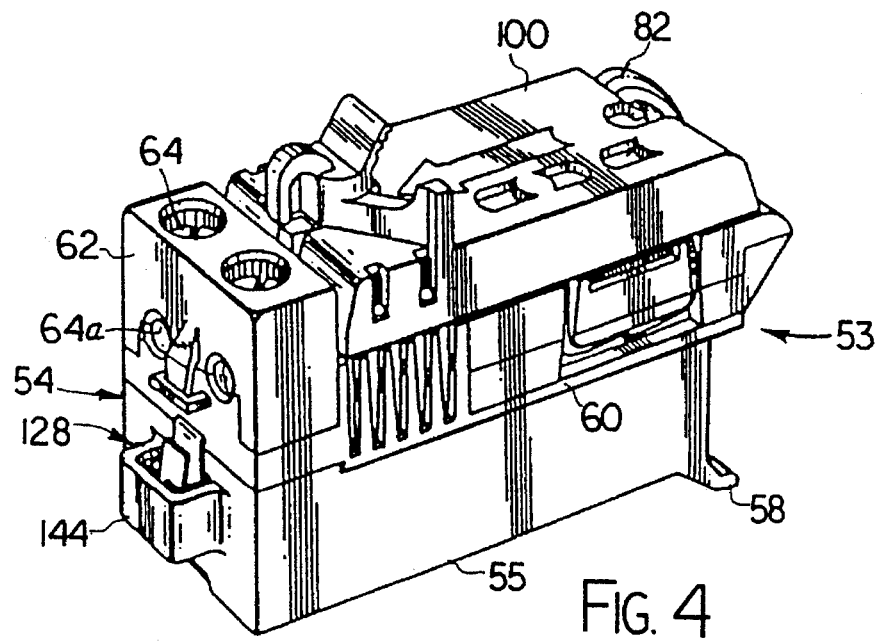
FIG. 4 is a perspective view of the network termination module of the invention with its cover closed.
Figure 5:
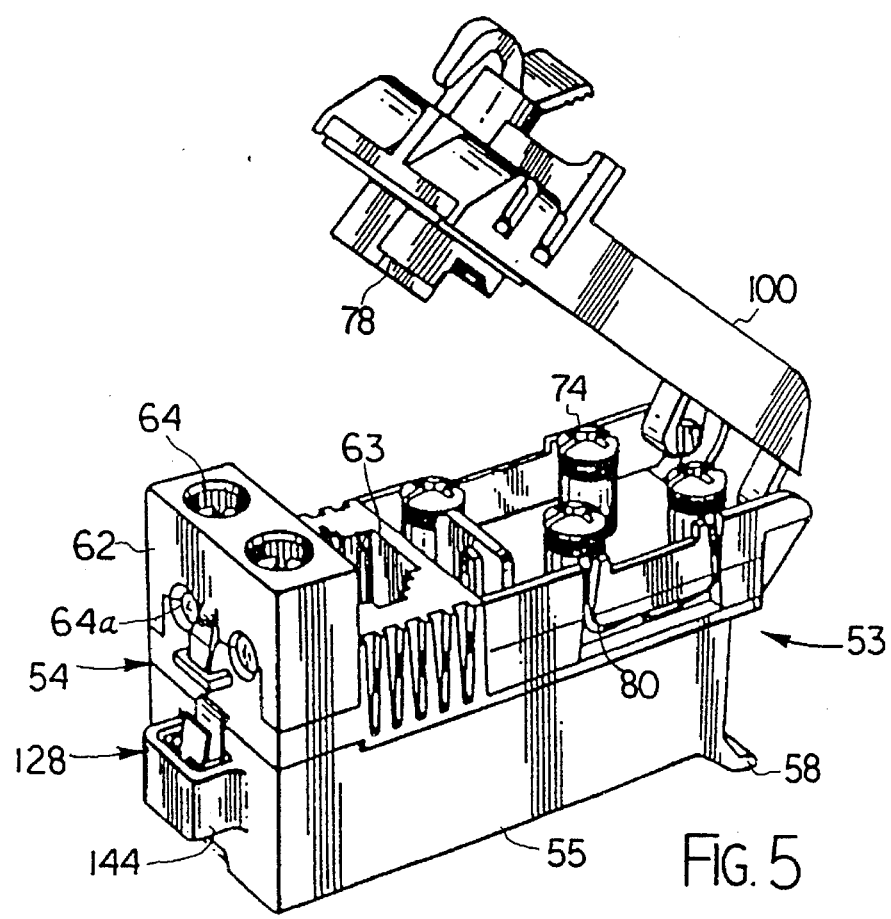
FIG. 5 is a perspective view of the network termination module of FIG. 4 with its cover opened.

This flexibility of utilization of the disclosed network interface device 10 is further enhanced by an arrangement of the subscriber wiring, indicated generally as 116 in FIGS. 1 and 2. As shown, the subscriber wiring 116 is clustered and enters the housing 12 through the opening 38 formed in wall 22. A number of wire guide brackets 118 are located within the housing, being disposed therein in longitudinally spaced alignment along the panel 14a. The guide brackets 118 are generally U-shaped metal members having feet 120 which may be attached by riveting, or otherwise, to the panel 14a. Each of the brackets is enclosed by a protective covering 122 formed of a soft plastic material to protect the wires from damage. The brackets also each contain a slot 124 of a size to permit the selective removal and/or relocation of a wire within the wiring cluster 116, In installing the wiring to the terminal strips 76 of the network termination modules 53, the routing is such that each wire in the cluster extends the full length of the path defined by the wire guide brackets 118 and thence to its assigned network termination module. In this way, the cumulative length of each wire in the cluster 116 is of such a length that reassignment of a terminal strip 76 to a different base structure can be effected without need to disconnect the wiring from the affected terminal strip or to adjust in any way the length of the concerned wire. Instead, all that is required is to detach the terminal strip 76 with its wiring intact from the initial base structure 54 and to move it to a new location for ready attachment to the base structure at that location.

This particular feature is best explained with reference to FIGS. 16a and 16b which are schematic representations of a telephone network interface device of the concerned type. These schematic drawings illustrate a device whose layout differs from that shown in FIGS. 1 and 2 to the extent that two parallel rows of network termination modules 53 are present rather than the single row arrangement of the earlier drawing figures. It will be observed that the routing of subscriber wiring in the schematic arrangement compels the maintenance of adequate slack during module installation to ensure that any terminal strip 76 can be moved from its original module to another module by simply detaching the object terminal trip, with its wiring still intact. This is in contradistinction from conventional wire routing schemes in which the wire extends without slack to connect with the module closest to the wire entry point. Thus, if for any reason a change to a more distant module is required, it can occur only upon disconnection of the wire and installation of additional wiring in order to extend the wire to the new module.

By means of the disclosed layout, therefore, in the event of a required change of the subscriber wiring connected to terminal strip 76 shown in FIG. 16a, it can simply be relocated to the alternate position shown in FIG. 16b without need for the performance of any fabricating or assembly steps by removing the affected wire from the cluster and, if necessary, releasing the wire through the slot 124 in one or more of the wire guide brackets 118 to enable connection of the concerned terminal strip to the alternate desired base structure.

The network termination modules 53 in the described telephone network interface device 10 employ grounding means in the form of an elongated ground bus 36 containing a plurality of tangs 126, each of which is adapted to electrically contact a grounding clip 128 provided adjacent the bottom of the base structure 54 in each module. The described arrangement is advantageously provided with improved grounding means in that, in order to avoid the need to fabricate the ground bus 36 to a specific length depending upon the length of the stack of modules 53, the bus is comprised of a number of sections 130, each being formed of uniform length and provided with means for connecting them in end-to-end, contiguous relation to form, within the housing 12, a ground bus of a length sufficient to accommodate the contemplated length of termination module stack. Thus, the ground bus 36 can comprise any number of elongated sections 130 formed of electrically-conductive material and provided along their upper edge with alternately disposed connector tangs 126 and stiffener members 132 separated by intermediate slots 134. As shown in FIGS. 14 and 15, the exposed corners of the tangs 126 and members 132 are cut on the oblique and one or both of the surface, here shown as being the distal surface 136 of the tangs is inclined in order to facilitate connection and retention of the network termination modules 53, as hereinafter explained.

In the disclosed arrangement, either one or both of the ends of each bus section 130 is displaced laterally from the longitudinal axis thereof and is provided with bolt holes 138 in order that the respective sections can be connected in overlapping contiguous relation within the housing. In the illustrated embodiment only one end, indicated as 140, is displaced with the displacement being an mount sufficient to receive the full thickness of the straight end 142 of the adjacent section thereby to insure alignment of the tang 126. Alternatively however, tang alignment can be equally achieved by lateral displacement in opposite directions of each end of the sections 130, in which case the amount of displacement at the respective ends can be correspondingly reduced.

In assembling each network termination module 53 onto the ground bus 36 the protective shroud 144 which surrounds each grounding clip 128 has its side ends made to enter the slots 134 whereupon the clip is brought into electrical contact with the desired tang 126. While contact engagement between the clip 128 and the tang 126 can be maintained by the friction effect produced by the resilient nature of the clip, the present invention contemplates enhancing the maintenance of the contact engagement between these members by providing each tang 126 with a detent 146 which, as shown in the drawing figures, may be in the form of a through-opening or, alternatively, may be in the form of a recessed depression formed in the surface of the tang that faces the clip. Regardless of the form of detent produced in the tang 126, the clip 128 has formed on its facing surface a projection 148, shown best in FIG. 12 as being rounded in nature so as to be received in the tang detent 146. Provision of the tang detents 146 in the manner described and of the cooperating projection 148 on the contact clip 128 not only provides a positive "feel" to detect proper seating and grounding of the modules 53, but also provides a supplemental retention force operating to inhibit unseating of the module from the device.

It will be understood that various changes in the details, materials and arrangements of parts which have been herein described and illustrated in order to explain the nature of the invention, may be made by those skilled in the art within the principle and scope of the invention as expressed in the appended claims.

We claim:

1. A telephone network interface device comprising:

a housing having an opening to the interior thereof, said housing interior containing a telco wiring portion and a subscriber portion, a plurality of network termination modules removably secured to said housing in stacked, side-by-side relation substantially within the subscriber portion thereof, means in said housing for accessing the telco wiring portion thereof with telephone company wiring, means in said housing for accessing the subscriber portion thereof with subscriber wiring connecting with said plurality of network termination modules, means forming a ground bus electrically connecting all of said plurality of network termination modules, and cover means effective to restrict access to said telco wiring portion of said housing including a pair of covers and means for mounting said covers for independent pivotal movement with respect to said housing, one of said covers being sized to operably close said housing opening, and the other of said covers being sized to operably close only said telco wiring portion of said housing interior.

2. A telephone network interface device according to claim 1 in which said means for mounting said covers includes a hinge member having a generally loop-shaped portion and means forming a notch in said cover configured for reception on said loop portion, whereby said cover can undergo a substantial degree of pivoted movement.

3. A telephone network interface device according to claim 2 including a plurality of hinge members disposed on longitudinally aligned spacing within said housing, and said cover containing a corresponding number of notches for reception on the loop portions of the respective hinge members.

4. A telephone network interface device according to claim 2 in which said notch in said cover is defined by an opening having a length at least slightly greater than the width of the loop portion of said hinge and a pair of opposed projections defining a slot extending to said opening whose width is less than the effective width of said loop portion.

5. A telephone network interface device according to claim 4 in which said loop portion contains a section of reduced width, the width of said section being not substantially greater than the width of said slot between said cover notch projections.

6. A telephone network interface device according to claim 5 in which said section of reduced width on said loop portion occurs intermediate the transverse ends of said hinge body.

7. A telephone network interface device according to claim 2 in which said hinge body is defined by strap material having outturned ends forming a base for attachment to said housing, and upstanding column members terminating in said loop portion.

8. A telephone network interface device according to claim 7 in which said loop portion contains a section of reduced width facing oppositely from said column members, said notch in said cover being defined by an opening having a length at least slightly greater than the width of said loop portion and a pair of opposed projections defining a slot extending to said opening whose width is less than the effective width of said loop portion.

9. A telephone network interface device according to claim 8 in which the width of said section is not substantially greater than the width of the slot between said cover notch projections.

10. A telephone network interface device according to claim 1 in which said ground bus has a length corresponding substantially to the length of the stacked network termination modules.

11. A telephone network interface device according to claim 10 in which said ground bus includes a plurality of longitudinal sections disposed in contiguous end-to-end relation.

12. A telephone network interface device according to claim 11 in which said sections are substantially of uniform length.

13. A telephone network interface device according to claim 11 in which each of said sections at an end thereof contains a portion laterally offset from the longitudinal axis of said section and disposed in overlapping relation with respect to the adjacent section.

14. A telephone network interface device according to claim 13 in which each of said sections is laterally offset at only one longitudinal end thereof.

15. A telephone network interface device according to claim 11 including means for connecting the ends of adjacent sections together.

16. A telephone network interface device according to claim 15 including holes formed adjacent the longitudinal ends of said sections for the cooperative reception of a connecting fastener.

17. A telephone network interface device according to claim 10 in which said ground bus contains a plurality of longitudinally spaced grounding tangs, each being adapted for electrical connection with an associated terminating module.

18. A telephone network interface device according to claim 17 in which said ground bus includes a stiffening member disposed intermediate each of said grounding tangs.

19. A telephone network interface device according to claim 17 including a locking detent formed on a contact member of said termination modules for engagement with said ground bus and means defining a detent receptor formed on said grounding tangs for reception of said termination module locking detent.

20. A telephone network interface device according to claim 19 in which said detent is a projection formed on the surface of said contact member and said detent receptor is sized to snugly receive said detent.

21. A telephone network interface device according to claim 20 in which said detent receptor is a recess formed in the surface of said grounding tang.

22. A telephone network interface device according to claim 20 in which said detent receptor is a through-opening extending through said grounding tang.

23. A telephone network interface device according to claim 1 in which each of said network termination modules contains a base structure, means on said base structure for connecting telco wiring thereto, a terminal strip containing terminals for connector subscriber wiring thereto, and releasable latch means for detachably coupling said terminal strip to said base structure.

24. A telephone network interface device according to claim 23 in which each of said network termination modules include means forming a removable cover overlying said releasable latch means.

25. A telephone network interface device according to claim 24 in which said removable cover is pivotally mounted on said terminal strip.

* * * * *